US012432506B2

(12) United States Patent
Bysted et al.

(10) Patent No.: US 12,432,506 B2
(45) Date of Patent: Sep. 30, 2025

(54) HEARING AID COMPRISING A SIGNAL PROCESSING NETWORK CONDITIONED ON AUXILIARY PARAMETERS

(71) Applicant: Oticon A/S, Smoerum (DK)

(72) Inventors: Peter Asbjørn Leer Bysted, Smoerum (DK); Jesper Jensen, Smoerum (DK); Lars Bramsloew, Smoerum (DK)

(73) Assignee: Oticon A/S, Smørum (DK)

( * ) Notice: Subject to any disclaimer, the term of this patent is extended or adjusted under 35 U.S.C. 154(b) by 177 days.

(21) Appl. No.: 18/306,262

(22) Filed: Apr. 25, 2023

(65) Prior Publication Data

US 2023/0353958 A1 Nov. 2, 2023

(30) Foreign Application Priority Data

May 2, 2022 (EP) .................................... 22171151

(51) Int. Cl.
*H04R 25/00* (2006.01)

(52) U.S. Cl.
CPC ....... *H04R 25/507* (2013.01); *H04R 2225/39* (2013.01); *H04R 2225/41* (2013.01)

(58) Field of Classification Search
CPC ...... H04R 17/00; H04R 17/005; H04R 17/02; H04R 17/025; H04R 25/505; H04R 25/507; H04R 2225/41; H04R 2225/43; H04R 2460/01; H10N 30/00; G10L 21/0208; G10L 25/30; G10L 21/0272; G10L 25/84; G10L 21/0264; G10L 21/0216
See application file for complete search history.

(56) References Cited

U.S. PATENT DOCUMENTS

| | | | | |
|---|---|---|---|---|
| 10,341,785 | B2 * | 7/2019 | Barker | H04R 25/505 |
| 11,012,791 | B2 * | 5/2021 | Elmedyb | H04R 25/505 |
| 11,270,198 | B2 * | 3/2022 | Busch | H04R 25/507 |
| 11,343,620 | B2 * | 5/2022 | Elmedyb | H04R 25/552 |
| 11,653,156 | B2 * | 5/2023 | Tiefenau | G10L 21/028 381/312 |
| 11,800,301 | B2 * | 10/2023 | Verhulst | G06N 3/084 |
| 11,889,268 | B2 * | 1/2024 | Kamkar-Parsi | H04R 25/552 |
| 2021/0185465 | A1 | 6/2021 | Bramslow | |

FOREIGN PATENT DOCUMENTS

WO WO2022/081260 4/2022

OTHER PUBLICATIONS

Yang, B., Le, Q. V., Bender, G., & Ngiam, J. (2019). CondConv: Conditionally parameterized convolutions for efficient inference. Advances in Neural Information Processing Systems, 32(NeurIPS).

* cited by examiner

*Primary Examiner* — Ryan Robinson

(57) ABSTRACT

A hearing aid adapted to be worn in or at an ear of a hearing aid user and/or to be fully or partially implanted in the head of the hearing aid user is disclosed. The hearing aid comprises a processing unit connected to said input unit and to said output unit, where the processing unit comprises a neural network, and where the processing unit is configured to determine signal processing parameters of the hearing aid based on weights of the neural network. A hearing system and a corresponding method is furthermore disclosed.

17 Claims, 5 Drawing Sheets

HEARING AID COMPRISING A SIGNAL PROCESSING NETWORK CONDITIONED ON AUXILIARY PARAMETERS

SUMMARY

The present application relates to a hearing aid adapted to be worn in or at an ear of a hearing aid user and/or to be fully or partially implanted in the head of the hearing aid user.

The present application further relates to a hearing system comprising a hearing aid and an auxiliary device.

The present application further relates to a method.

The present application further relates to a data processing system comprising a processor and program code means for causing the processor to perform at least some of the steps of the method.

The present application further relates to a computer program comprising instructions which, when the program is executed by a computer, cause the computer to carry out the method.

A Hearing Aid

Some modern hearing aids use in-the-hearing-aid-neural-networks to perform some of the signal processing. As an example, a deep neural network may be implemented to perform part of the noise reduction. Currently, such neural networks are fixed. In other words, the same neural network is given to every hearing aid user and the same neural network is used in all acoustic situations.

However, such neural networks would perform better if they were adapted to the specific hearing aid user and/or acoustic situation. In other words, ideally, a different neural network could be used for different hearing aid users or acoustic situation, e.g. as indicated by user data (e.g., the audiogram), behavioural data, user preferences, etc.

Conventionally, this might be done through training a network for each individual hearing aid user or each individual acoustic situation. However, this approach would be infeasible, as network training (a complicated process involving large amounts of data, computational power, and time) would have to be done at the hearing care clinic and would also be impossible for changing needs or changing of programme on-the-go.

Accordingly, there is a need for a solution to this problem, which avoids this impractical training phase, and which would make it feasible to employ different neural networks for different users, user needs, and acoustic situations. This approach might be applicable to other devices using neural networks for signal processing, including, but not limited to, cochlear implants, headsets, hearing assistive devices in general, etc.

In an aspect of the present application, a hearing aid is provided.

The hearing aid is adapted to be worn in or at an ear of a hearing aid user and/or to be fully or partially implanted in the head of the hearing aid user.

The hearing aid comprises an input unit for receiving an input sound signal from an acoustic environment of a hearing aid user and providing at least one electric input signal representing said input sound signal.

The input unit may comprise an input transducer, e.g. a microphone, for converting an input sound to an electric input signal. The input unit may comprise a wireless receiver for receiving a wireless signal comprising or representing sound and for providing an electric input signal representing said sound.

The hearing aid comprises an output unit for providing at least one set of stimuli perceivable as sound to the hearing aid user based on processed versions of said at least one electric input signal.

The output unit may comprise an output transducer. The output transducer may comprise a receiver (loudspeaker) for providing the stimulus as an acoustic signal to the user (e.g. in an acoustic (air conduction based) hearing aid).

The output unit may comprise a number of electrodes of a cochlear implant (for a CI type hearing aid) or a vibrator of a bone conducting hearing aid. The output transducer may comprise a vibrator for providing the stimulus as mechanical vibration of a skull bone to the user (e.g. in a bone-attached or bone-anchored hearing aid).

The output unit may (additionally or alternatively) comprise a transmitter for transmitting sound picked up-by the hearing aid to another device, e.g. a far-end communication partner (e.g. via a network, e.g. in a telephone mode of operation, or in a headset configuration).

The hearing aid comprises a processing unit connected to said input unit and to said output unit. The processing unit comprises a neural network. The processing unit is configured to determine signal processing parameters of the hearing aid based on weights of the neural network.

The hearing aid may be adapted to provide a frequency dependent gain and/or a level dependent compression and/or a transposition (with or without frequency compression) of one or more frequency ranges to one or more other frequency ranges, e.g. to compensate for a hearing impairment of a user.

Thereby, the processing unit provides processed versions of said at least one electric input signal.

The hearing aid comprises a memory storing the weights of the hearing aid.

The hearing aid comprises an antenna and a transceiver circuitry for establishing a communication link to an auxiliary device.

The communication link may be a wireless link to an entertainment device (e.g. a TV-set), a communication device (e.g. a telephone), a wireless microphone, another hearing aid, a server device (e.g. a cloud server), or a processor unit, etc. The hearing aid may thus be configured to wirelessly receive a direct electric input signal from another device. Likewise, the hearing aid may be configured to wirelessly transmit a direct electric output signal to another device. The direct electric input or output signal may represent or comprise an audio signal and/or a control signal and/or an information signal.

In general, a wireless link established by antenna and transceiver circuitry of the hearing aid can be of any type. The wireless link may be a link based on near-field communication, e.g. an inductive link based on an inductive coupling between antenna coils of transmitter and receiver parts. The wireless link may be based on far-field, electromagnetic radiation. Preferably, frequencies used to establish a communication link between the hearing aid and the other device is below 70 GHz, e.g. located in a range from 50 MHz to 70 GHz, e.g. above 300 MHz, e.g. in an ISM range above 300 MHz, e.g. in the 900 MHz range or in the 2.4 GHz range or in the 5.8 GHz range or in the 60 GHz range (ISM=Industrial, Scientific and Medical, such standardized ranges being e.g. defined by the International Telecommunication Union, ITU). The wireless link may be based on a standardized or proprietary technology. The wireless link may be based on Bluetooth technology (e.g. Bluetooth Low-Energy technology), or Ultra Wide Band (UWB) technology.

The hearing aid, e.g. the input unit, and/or the antenna and transceiver circuitry may comprise a transform unit for converting a time domain signal to a signal in the transform domain (e.g. frequency domain or Laplace domain, etc.). The transform unit may be constituted by or comprise a TF-conversion unit for providing a time-frequency representation of an input signal. The time-frequency representation may comprise an array or map of corresponding complex or real values of the signal in question in a particular time and frequency range. The TF conversion unit may comprise a filter bank for filtering a (time varying) input signal and providing a number of (time varying) output signals each comprising a distinct frequency range of the input signal. The TF conversion unit may comprise a Fourier transformation unit (e.g. a Discrete Fourier Transform (DFT) algorithm, or a Short Time Fourier Transform (STFT) algorithm, or similar) for converting a time variant input signal to a (time variant) signal in the (time-)frequency domain. The frequency range considered by the hearing aid from a minimum frequency fmin to a maximum frequency fmax may comprise a part of the typical human audible frequency range from 20 Hz to 20 kHz, e.g. a part of the range from 20 Hz to 12 kHz. Typically, a sample rate fs is larger than or equal to twice the maximum frequency fmax, $fs \geq 2fmax$. A signal of the forward and/or analysis path of the hearing aid may be split into a number NI of frequency bands (e.g. of uniform width), where NI is e.g. larger than 5, such as larger than 10, such as larger than 50, such as larger than 100, such as larger than 500, at least some of which are processed individually. The hearing aid may be adapted to process a signal of the forward and/or analysis path in a number NP of different frequency channels ($NP \leq NI$). The frequency channels may be uniform or non-uniform in width (e.g. increasing in width with frequency), overlapping or non-overlapping.

The weights of the neural network is adaptively adjustable weights.

Adaptively adjustable weights may refer to weights or parameters of a neural network that may be updated/adjusted/corrected one or more times.

Adaptively adjustable weights may refer to weights or parameters and bias units of a neural network that may be updated/adjusted/corrected one or more times.

The hearing aid is configured to receive configuration data from the auxiliary device regarding adjustment of said adaptively adjustable weights.

The hearing aid is configured to receive configuration data from the auxiliary device regarding configuration of said adaptively adjustable weights.

The term, regarding adjustment or regarding configuration, may refer to that the configuration data may contain information, such as parameters, weights, neural network information, that enable the hearing aid or its processing unit to adjust/update/alter the weights of its neural network or the network itself.

The configuration data may be transferred from the auxiliary device via the communication link and be received by the hearing aid. The antenna and transceiver circuitry of the hearing aid and of the auxiliary device may carry out the transferring and receiving of the configuration data.

The processing unit is configured to adjust the adaptively adjustable weights of the neural network based on said configuration data.

Thus, a solution is provided that eliminates the need for carrying out an impractical training phase, and which makes it feasible to employ different neural networks for different users, user needs, and acoustic situations. Further, the solution may be applied as an on-the-go (in-situ) updating of the signal processing parameters of a hearing aid according to an alternating acoustic environment of the hearing aid user.

The configuration data may be based on a hearing ability of the hearing aid user. For example, the configuration data may be based on an audiogram of the hearing aid user.

The configuration data may be based on signal/data from a number of detectors configured to provide status signals relating to a current physical environment of the hearing aid (e.g. the current acoustic environment), and/or to a current state of the user wearing the hearing aid, and/or to a current state or mode of operation of the hearing aid. Alternatively, or additionally, one or more detectors may form part of the auxiliary device or of the hearing aid.

One or more of the number of detectors may operate on the full band signal (time domain). One or more of the number of detectors may operate on band split signals ((time-) frequency domain), e.g. in a limited number of frequency bands.

The configuration data may be based on a sound scene classification of the sound environment of the hearing aid user.

For example, the configuration data may be based on signal/data from an SNR estimator or SNR detector.

For example, the configuration data may be based on signal/data from an SPL estimator or SPL detector.

The SPL estimator or SPL detector may estimate a current level of a signal of the forward path of the hearing aid. The SPL estimator or SPL detector may be configured to decide whether the current level of a signal of the forward path is above or below a given (L-)threshold value. The SPL estimator or SPL detector may operate on the full band signal (time domain) The level detector may operate on band split signals ((time-) frequency domain).

For example, the configuration data may be based on signal/data from at least one accelerometer.

The accelerometer may be configured to detect movement of the hearing aid user's facial muscles and/or bones, e.g. due to speech or chewing (e.g. jaw movement), or movement/turning of the hearing aid user's face in e.g. vertical and/or horizontal direction, and to provide a detector signal indicative thereof.

The accelerometer may be configured to detect jaw movements. The hearing aid may be configured to apply the jaw movements as an additional cue for own voice detection. For example, movements may be detected when the hearing aid user is nodding, e.g. as an indication that the hearing aid user is following and is interested in the sound signal/talk of a conversation partner/speaking partner.

The movement sensor may be configured to detect movements of the hearing aid user following a speech onset (e.g. as determined by a voice detector (VD), voice activity detector (VAD), and/or an own voice detector (OVD)). For example, movements, e.g. of the head, following a speech onset may be an attention cue indicating a sound source of interest.

The configuration data may be based on signal/data from a VAD. The VAD may be configured for estimating whether or not (or with what probability) an input signal comprises a voice signal (at a given point in time). A voice signal may in the present context be taken to include a speech signal from a human being. It may also include other forms of utterances generated by the human speech system (e.g. singing). The voice activity detector unit may be adapted to classify a current acoustic environment of the user as a VOICE or NO-VOICE environment. This has the advantage that time segments of the electric microphone signal comprising human utterances (e.g. speech) in the user's environment can be identified, and thus separated from time segments only (or mainly) comprising other sound sources (e.g. artificially generated noise). The voice activity detector may be adapted to detect as a VOICE also the user's own voice. Alternatively, the voice activity detector may be adapted to exclude a user's own voice from the detection of a VOICE.

The configuration data may be based on signal/data from an OVD. The OVD may be configured for estimating whether or not (or with what probability) a given input sound (e.g. a voice, e.g. speech) originates from the voice of the user of the system. A microphone system of the hearing aid may be adapted to be able to differentiate between a user's own voice and another person's voice and possibly from NON-voice sounds.

The configuration data may be based on a physiological parameter of the hearing aid user. For example, the hearing aid may further comprise one or more of different types of physiological sensors for providing the physiological parameter, where the one or more of different types of physiological sensors are configured to measure one or more physiological signals, such as electrocardiogram (ECG), photoplethysmogram (PPG), electroencephalography (EEG), electrooculography (EOG), etc., of the user.

Electrode(s) of the one or more different types of physiological sensors may be arranged at an outer surface of the hearing aid. For example, the electrode(s) may be arranged at an outer surface of a behind-the-ear (BTE) part and/or of an in-the-ear (ITE) part of the hearing aid.

Thereby, the electrodes come into contact with the skin of the user (either behind the ear or in the ear canal), when the user puts on the hearing aid.

The configuration data may be based on a frequency dependent gain parameter.

For example, for the HCP to finetune the hearing aid manually, the configuration data (e.g. auxiliary parameters input to a further neural network) may include a frequency dependent gain parameter. This may be done by generating a new set of parameters that parameterizes the loss function—i.e., a frequency weighting of the different channels in the loss function. For example, if the hearing aid user wants more brightness, one can put an emphasis on the higher frequency channels. These parameters may then also be used as inputs for the further neural network. There might also be a parameter related to the amount and type of compression, which could be parameterized in the loss function.

The hearing aid may comprise a plurality (e.g. two or more) of detectors/sensor and/or estimators which may be operated in parallel. For example, two or more of the physiological sensors may be operated simultaneously to increase the reliability of the measured physiological signals.

Accordingly, a neural network may be trained once and for all (at the hearing aid manufacturer). This pre-trained neural network may take as input information about the specific user, e.g., her audiogram, or the specific acoustic situation, e.g., a car cabin situation, and output the weights/parameters of a user- or acoustic-situation dependent network, which performs particularly well for the situation at hand.

A further neural network may be generated. The further network may be a pre-trained neural network that may process an input audio signal x, conditioned on some other parameters p, reflecting the user needs/acoustic situation. For example, the input audio signal x may be a noisy speech signal. The further neural network may take the form:

$$f(x;w)=f(x;g(p))$$

where w is the neural network's parameters, that are found by the function g taking the auxiliary parameters, p, as inputs.

Accordingly, the two different neural networks may be differentiated by their function:

a) The neural network of the processing unit, which directly or indirectly operates on the at least one electric input signal, for example (but not limited to) by a waveform-to-waveform transformation, or by generating a mask in the spectrotemporal domain, and b) the further neural network (e.g. a weight generating network) which operates/adjusts on the parameters/weights of the neural network of the processing unit.

The further neural network may be configured to know the structure (e.g. the number of weights) of the neural network of the processing unit of the hearing aid.

The configuration data may comprise a further neural network.

The adaptively adjustable weights of the neural network of the processing unit may be adjusted by replacing the neural network of the processing unit by said further neural network of the configuration data.

The configuration data may comprise weights of a neural network.

The adaptively adjustable weights of the neural network of the processing unit may be adjusted by replacing said weights by the weights of said configuration data.

The configuration data may comprise a plurality of coefficients.

The configuration data may constitute a plurality of coefficients.

The adaptively adjustable weights of the neural network of the processing unit may be adjusted based on weights resulting from a linear combination of said plurality of coefficients and a plurality of matrices each comprising a plurality of weights.

The adaptively adjustable weights of the neural network of the processing unit may be replaced/exchanged based on weights resulting from a linear combination of said plurality of coefficients and a plurality of matrices each comprising a plurality of weights.

For example, the plurality of matrices may comprise a plurality of predetermined weights. The plurality of matrices may be stored on the memory of the hearing aid.

Based on the configuration data, the processing unit may be configured to determine signal processing parameters relating to noise reduction of the hearing aid user.

Based on the configuration data, the processing unit may be configured to determine signal processing parameters relating to hearing loss compensation of the hearing aid user.

Based on the configuration data, the processing unit may be configured to determine signal processing parameters relating to feedback reduction of the hearing aid user.

The hearing aid may further comprise a signal-to-noise ratio (SNR) estimator configured to determine SNR in the environment of the hearing aid user.

The hearing aid may further comprise a sound pressure level (SPL) estimator for measuring the level of sound at the input unit.

The hearing aid may further comprise at least one physiological sensor.

The hearing aid may further comprise at least one accelerometer.

The hearing aid may comprise a sound scene classifier configured to classify said acoustic environment of the hearing aid user into a number of different sound scene classes.

The hearing aid may comprise a sound scene classifier configured to provide a current sound scene class in dependence of a current representation, e.g. extracted features, of said at least one electric input signal.

The sound scene classifier may be configured to classify the current situation based on input signals from (at least some of) the detectors/sensors/estimators/accelerometer, and possibly other inputs as well. In the present context 'a current situation' may be taken to be defined by one or more of:

a) the physical environment (e.g. including the current electromagnetic environment, e.g. the occurrence of electromagnetic signals (e.g. comprising audio and/or control signals) intended or not intended for reception by the hearing aid, or other properties of the current environment than acoustic);
b) the current acoustic situation (input level, feedback, etc.), and
c) the current mode or state of the user (movement, temperature, cognitive load, etc.);
d) the current mode or state of the hearing aid (program selected, time elapsed since last user interaction, etc.) and/or of another device in communication with the hearing aid.

The auxiliary device may be a hearing aid.

The auxiliary device may be a smart phone.

The auxiliary device may be a server device.

For example, the server device may be a cloud server.

A Hearing System

In a further aspect, a hearing system comprising a hearing aid as described above, in the 'detailed description of embodiments', and in the claims, AND an auxiliary device is moreover provided.

In a further aspect, a hearing system comprising a hearing aid as described above and an auxiliary device is provided.

Each of the hearing aid and the auxiliary device includes an antenna and a transceiver circuitry for establishing a communication link there between, and thereby allowing the exchange of information between the hearing aid and the auxiliary device.

For example, the auxiliary device may e.g. comprise another hearing aid, a remote control, an audio delivery device, a telephone (e.g. a smartphone), an external sensor, etc.

The auxiliary device may comprise the further neural network for determining said configuration data.

The further neural network may be a weight generating network.

In general, a neural network is dependent on its architecture and the parameters related to the architecture, i.e., the bias, the weights and parameters related to other transformations. We denote the whole set of neural network parameters by $\Theta$. These parameters may be found during training by optimizing an objective function and are fixed during deployment.

During training, instead a further neural network (the weight generating network) may be trained such that the parameters $\Theta$ are learned, conditioned on some other parameters, denoted as auxiliary parameters. Mathematically, this can be described as, $g: P \rightarrow \Theta$, where P is the auxiliary parameter space, $\Theta$ is the network parameter space, and where g is a neural network.

A similar, but fundamentally different approach has been suggested in the literature [1], where the convolutional kernel has been proposed to increase model complexity while keeping the model architecture size fixed. The difference is that in [1], the network is conditioned on the input, or embeddings of the input, i.e. $g: X \rightarrow \Theta$ where X is the input space. The approach is similar to using a mixture of experts, which is well known in machine learning.

The weight-generating network may generate weights to be used in a specific, pre-specified network structure (e.g. the neural network of the processing unit); typically, this network may be a deep neural network.

The neural network of the processing unit may transform an input signal using N samples/coefficients into the same type of N output samples/coefficients. The network may be a traditional feed-forward DNN with no memory, or an LSTM or CRNN which both contain memory and thus are able to learn from previous input samples.

With using a traditional feed-forward DNN, it may also be modified to be a so-called auto encoder in which the middle layer of the network has a smaller dimension than the input and output dimension N. This transforms the input into a simpler representation that contains the essential features, which may then be modified to obtain a given result. These denoising and super-resolution auto-encoders have successfully been used to enhance noisy and blurry images back to noise-free high-resolution images.

For deep neural networks, the training is computationally intensive while the application (inference) of the trained (now fixed) network is less demanding and can thus be executed in a hearing aid or in a hearing system comprising an auxiliary device (e.g. a smartphone).

The weight generating network may be implemented on any auxiliary device that can be connected to the hearing aid. Fast computation time is not essential.

The weight generating network may be configured to determine said configuration data based on one or more auxiliary parameters.

The one or more auxiliary parameters may comprise a hearing ability of the hearing aid user. For example, the one or more auxiliary parameters may comprise an audiogram indicating the hearing ability of the hearing aid user.

The one or more auxiliary parameters may comprise a sound scene classification of the sound environment of the hearing aid user.

The one or more auxiliary parameters may comprise a physiological parameter of the hearing aid user.

For example, the auxiliary parameters might be anything we wish to condition the neural networks on. The auxiliary parameters may comprise:

Automated statistics: For example, statistics detected by the hearing aid, phone or external device. This could for example be an environment-classification algorithm executed in the hearing aid, e.g. detection that the hearing aid user is in a car, at a concert, etc., and providing this information to the weight generating network (pre-trained network) (which may be executed in the hearing aid or elsewhere).

Clinical statistics: This could be related to measurements performed in the clinic by the health care professional—for example, information related to the hearing loss of hearing aid user (e.g., an audiogram) could be provided as input to the weight generating network, which would output the weights of a network which would be particularly well-suited for this particular hearing loss.

User preferences: This could—for example—be the hearing aid user indicating via a user interface (to the weight generating network) that he/she is in a particular acoustic situation, e.g., a car cabin.

As indicated, there can be both static and dynamic auxiliary parameters.

An example of a signal processing network could be using a Wave-U-Net structure to do denoising. The convolutional parameters (c_p) and biases for each layer would be a tensor with the shape:

$$\text{shape}(c\_p)=[\text{kernel\_size},\text{channels\_out},\text{channels\_in}],\ \text{and shape(bias)}=[\text{channels\_out}]$$

For example, the Wave-U-Net structure may be extended to have weights of the form:

$$\text{shape}(c\_p)=[N,\text{kernel\_size\_channels\_out},\text{channels\_in}],\ \text{and shape(bias)}=[N,\text{channels\_out}]$$

In this case, the weight generating network would learn a way to generate weights with the original shape of the Wave-U-Net, by a linear combination of the N convolutional parameters and biases collected in the tensor w, i.e:

$$w=\sum_{i=1}^{N} w_i g(p)_i.$$

In this case, the parameters p could be the user program, user preferences, audiological measures, or some environment statistics.

For example, the training of the neural networks of the hearing system may be performed in the product development phase based on different user programs, audiological measurements and a library of signals and noises. The weights of the weight generating network may be found by conventional optimization techniques such as gradient descent using backpropagation, genetic algorithms etc.

The auxiliary parameters might be related to the input and output distribution of the training set or the loss function, or any extensions of these.

The auxiliary device may comprise a sound scene classifier.

The sound scene classifier may be configured to classify the acoustic environment of the hearing aid user into a number of different sound scene classes.

The sound scene classifier may be configured to provide a current sound scene class in dependence of a current representation, e.g. extracted features, of a sound signal from the acoustic environment of the hearing aid user.

The sound scene classifier may be configured to provide said current sound scene class as input to the weight generating network.

The auxiliary device may comprise an SNR estimator.

The auxiliary device may comprise an SPL estimator.

The auxiliary device may comprise at least one physiological sensor.

The auxiliary device may comprise at least one accelerometer.

The weight generating network may be configured to determine said configuration data based on the one or more auxiliary parameters from said SNR estimator.

The weight generating network may be configured to determine said configuration data based on the one or more auxiliary parameters from said SPL estimator.

The weight generating network may be configured to determine said configuration data based on the one or more auxiliary parameters from said at least one physiological sensor.

The weight generating network may be configured to determine said configuration data based on the one or more auxiliary parameters from said at least one accelerometer.

The weight generating network for determining said configuration data may be initiated by input from the hearing aid user.

For example, input from the hearing aid user may comprise a voice input, such as a voice command from the hearing aid user. The hearing aid may comprise a voice user interface to allow the user to interact with the hearing aid via voice or speech commands.

For example, input from the hearing aid user may comprise a haptic touch, such as the user touching a touch screen of the auxiliary device or buttons on the hearing aid or of the auxiliary device.

For example, the weight generating network may be configured to determine said configuration data and send said configuration data to the neural network of the processing unit in response to input from the hearing aid user.

The weight generating network for determining said configuration data may be initiated based on the current sound scene class.

The weight generating network for determining said configuration data may be initiated based on data from said SNR estimator exceeding respective threshold values.

The weight generating network for determining said configuration data may be initiated based on data from said SPL estimator exceeding respective threshold values.

The weight generating network for determining said configuration data may be initiated based on data from said at least one physiological sensor exceeding respective threshold values.

The weight generating network for determining said configuration data may be initiated based on data from said at least one accelerometer exceeding respective threshold values.

The auxiliary device may comprise a remote control, a smartphone, or other portable or wearable electronic device, such as a smartwatch or the like.

The auxiliary device may be constituted by or comprise a remote control for controlling functionality and operation of the hearing aid(s). The function of a remote control may be implemented in a smartphone, the smartphone possibly running an APP allowing to control the functionality of the audio processing device via the smartphone (the hearing aid(s) comprising an appropriate wireless interface to the smartphone, e.g. based on Bluetooth or some other standardized or proprietary scheme).

The auxiliary device may be constituted by or comprise an audio gateway device adapted for receiving a multitude of audio signals (e.g. from an entertainment device, e.g. a TV or a music player, a telephone apparatus, e.g. a mobile telephone or a computer, e.g. a PC) and adapted for selecting and/or combining an appropriate one of the received audio signals (or combination of signals) for transmission to the hearing aid.

The auxiliary device may be constituted by or comprise another hearing aid. The hearing system may comprise two hearing aids adapted to implement a binaural hearing system, e.g. a binaural hearing aid system.

Use:

In an aspect, use of a hearing aid as described above, in the 'detailed description of embodiments' and in the claims, is moreover provided. Use may be provided in a hearing system comprising one or more hearing aids (e.g. hearing instruments), headsets, ear phones, active ear protection systems, etc., e.g. in handsfree telephone systems, teleconferencing systems (e.g. including a speakerphone), public address systems, karaoke systems, classroom amplification systems, etc.

A Method:

In an aspect, a method is furthermore provided.

The method comprises receiving an input sound signal from an acoustic environment of a hearing aid user and providing at least one electric input signal representing said input sound signal, by an input unit.

The method comprises providing at least one set of stimuli perceivable as sound to the hearing aid user based on processed versions of said at least one electric input signal, by an output unit.

The method comprises determining signal processing parameters of the hearing aid based on weights of a neural network, by a processing unit connected to said input unit and to said output unit and comprising the neural network.

The method comprises providing processed versions of said at least one electric input signal, by the processing unit.

The method comprises storing said weights of the hearing aid, by a memory.

The method comprises establishing a communication link to an auxiliary device, by an antenna and a transceiver circuitry.

Said weights of the neural network is adaptively adjustable weights.

The hearing aid receives configuration data from the auxiliary device regarding adjustment of said adaptively adjustable weights.

The processing unit adjusts the adaptively adjustable weights of the neural network based on said configuration data.

It is intended that some or all of the structural features of the hearing aid and hearing system described above, in the 'detailed description of embodiments' or in the claims can be combined with embodiments of the method, when appropriately substituted by a corresponding process and vice versa. Embodiments of the method have the same advantages as the corresponding hearing aid and hearing system.

A Computer Readable Medium or Data Carrier:

In an aspect, a tangible computer-readable medium (a data carrier) storing a computer program comprising program code means (instructions) for causing a data processing system (a computer) to perform (carry out) at least some (such as a majority or all) of the (steps of the) method described above, in the 'detailed description of embodiments' and in the claims, when said computer program is executed on the data processing system is furthermore provided by the present application.

A Computer Program:

A computer program (product) comprising instructions which, when the program is executed by a computer, cause the computer to carry out (steps of) the method described above, in the 'detailed description of embodiments' and in the claims is furthermore provided by the present application.

A Data Processing System:

In an aspect, a data processing system comprising a processor and program code means for causing the processor to perform at least some (such as a majority or all) of the steps of the method described above, in the 'detailed description of embodiments' and in the claims is furthermore provided by the present application.

An APP:

In a further aspect, a non-transitory application, termed an APP, is furthermore provided by the present disclosure. The APP comprises executable instructions configured to be executed on an auxiliary device to implement a user interface for a hearing aid or a hearing system described above in the 'detailed description of embodiments', and in the claims. The APP may be configured to run on cellular phone, e.g. a smartphone, or on another portable device allowing communication with said hearing aid or said hearing system.

Definitions

In the present context, a hearing aid, e.g. a hearing instrument, refers to a device, which is adapted to improve, augment and/or protect the hearing capability of a user by receiving acoustic signals from the user's surroundings, generating corresponding audio signals, possibly modifying the audio signals and providing the possibly modified audio signals as audible signals to at least one of the user's ears. Such audible signals may e.g. be provided in the form of acoustic signals radiated into the user's outer ears, acoustic signals transferred as mechanical vibrations to the user's inner ears through the bone structure of the user's head and/or through parts of the middle ear as well as electric signals transferred directly or indirectly to the cochlear nerve of the user.

The hearing aid may be configured to be worn in any known way, e.g. as a unit arranged behind the ear with a tube leading radiated acoustic signals into the ear canal or with an output transducer, e.g. a loudspeaker, arranged close to or in the ear canal, as a unit entirely or partly arranged in the pinna and/or in the ear canal, as a unit, e.g. a vibrator, attached to a fixture implanted into the skull bone, as an attachable, or entirely or partly implanted, unit, etc. The hearing aid may comprise a single unit or several units communicating (e.g. acoustically, electrically or optically) with each other. The loudspeaker may be arranged in a housing together with other components of the hearing aid, or may be an external unit in itself (possibly in combination with a flexible guiding element, e.g. a dome-like element).

A hearing aid may be adapted to a particular user's needs, e.g. a hearing impairment. A configurable signal processing circuit of the hearing aid may be adapted to apply a frequency and level dependent compressive amplification of an input signal. A customized frequency and level dependent gain (amplification or compression) may be determined in a fitting process by a fitting system based on a user's hearing data, e.g. an audiogram, using a fitting rationale (e.g. adapted to speech). The frequency and level dependent gain may e.g. be embodied in processing parameters, e.g. uploaded to the hearing aid via an interface to a programming device (fitting system), and used by a processing algorithm executed by the configurable signal processing circuit of the hearing aid.

A 'hearing system' refers to a system comprising one or two hearing aids, and a 'binaural hearing system' refers to a system comprising two hearing aids and being adapted to cooperatively provide audible signals to both of the user's ears. Hearing systems or binaural hearing systems may further comprise one or more 'auxiliary devices', which communicate with the hearing aid(s) and affect and/or benefit from the function of the hearing aid(s). Such auxiliary devices may include at least one of a remote control, a remote microphone, an audio gateway device, an entertainment device, e.g. a music player, a wireless communication device, e.g. a mobile phone (such as a smartphone) or a tablet or another device, e.g. comprising a graphical interface. Hearing aids, hearing systems or binaural hearing systems may e.g. be used for compensating for a hearing-impaired person's loss of hearing capability, augmenting or protecting a normal-hearing person's hearing capability and/or conveying electronic audio signals to a person. Hearing aids or hearing systems may e.g. form part of or interact with public-address systems, active ear protection systems, handsfree telephone systems, car audio systems, entertainment (e.g. TV, music playing or karaoke) systems, teleconferencing systems, classroom amplification systems, etc.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

The figures are schematic and simplified for clarity, and they just show details which are essential to the understanding of the disclosure, while other details are left out. Throughout, the same reference signs are used for identical or corresponding parts.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

Figure 1:
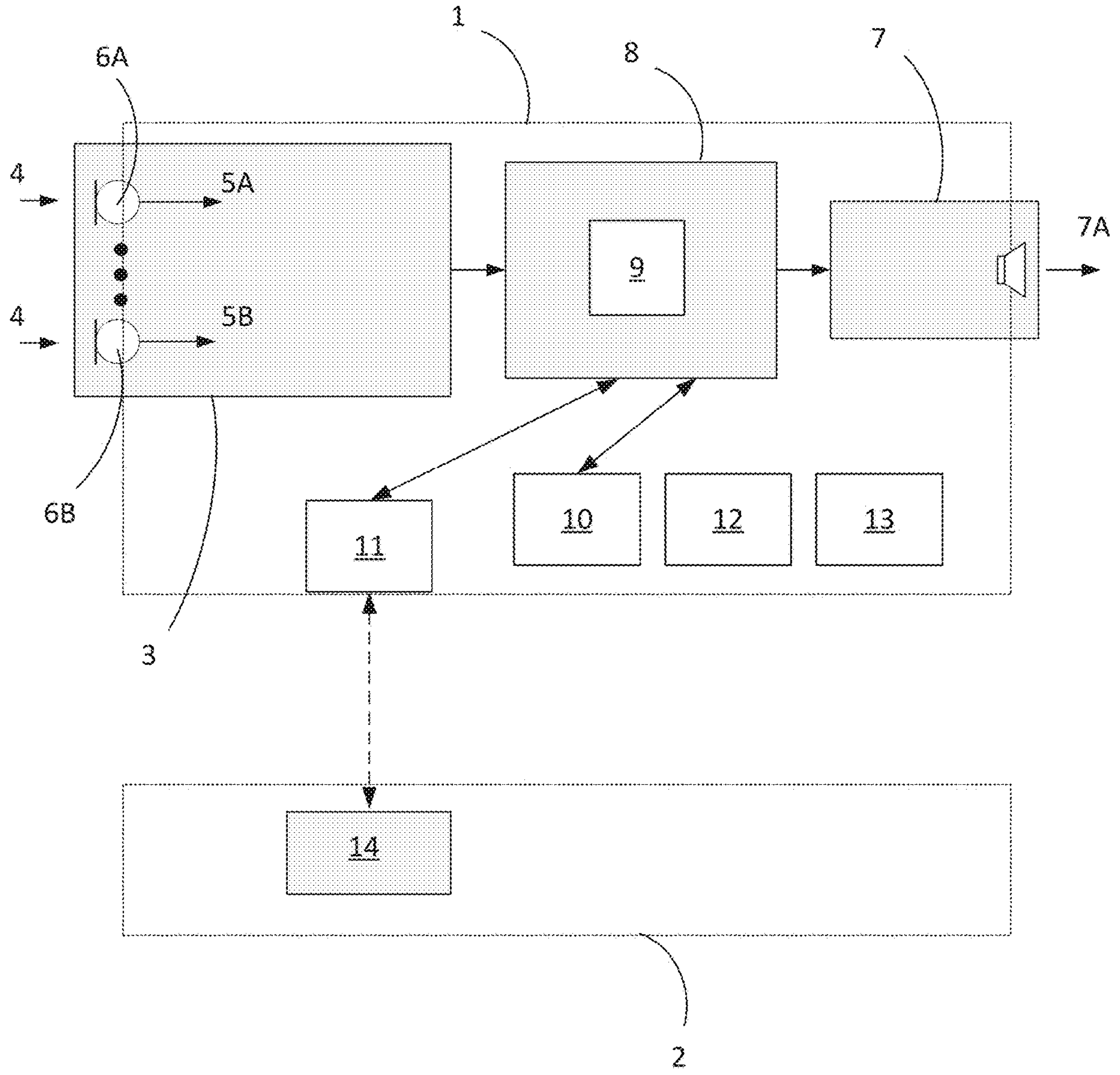
FIG. 1 shows an exemplary hearing system according to the present application.

FIG. 1 shows an exemplary hearing system according to the present application.

In FIG. 1, a hearing aid 1 and an auxiliary device 2 are shown. The hearing aid 1 and the auxiliary device may together form a hearing system.

Hearing aid 1 may be adapted to be worn in or at an ear of a hearing aid user and/or to be fully or partially implanted in the head of the hearing aid user.

The auxiliary device 2 may comprise another hearing aid located at the other ear of the hearing aid user. Alternatively, the auxiliary device 2 may comprise a smart phone or a server device.

The hearing aid may comprise an input unit 3 for receiving an input sound signal 4 from an acoustic environment of a hearing aid user and provide at least one electric input signal 5A,5B representing said input sound signal.

In FIG. 1, it is shown that the input unit 3 may also comprise two or more input transducers 6A,6B, e.g. microphones, for converting said input sound signals 4 to said at least one electric input signal 5A,5B.

The hearing aid may comprise an output unit 7 for providing at least one set of stimuli 7A perceivable as sound to the hearing aid user based on processed versions of said at least one electric input signal 5A,5B.

The hearing aid may comprise a processing unit 8 connected to said input unit 3 and to said output unit 7.

The processing unit may comprise a neural network 9, and where the processing unit 8 is configured to determine signal processing parameters of the hearing aid 1 based on weights of the neural network. The weights may be adaptively adjustable weights.

Thereby, the processing unit 8 provides processed versions of said at least one electric input signal 5A,5B.

The hearing aid 1 may comprise a memory 10 storing said weights of the neural network 9 of the hearing aid 1. Accordingly, the memory 10 may both send and receive the presently used weights and/or reference weights. Additionally, or alternatively, the memory 10 may send and receive weights that have been adjusted based on configuration data from the auxiliary device 2.

The hearing aid 1 may comprise an antenna and a transceiver circuitry 11 for establishing a communication link to the auxiliary device 2.

The hearing aid 1 may be configured to receive the configuration data from the auxiliary device 2 regarding adjustment of said adaptively adjustable weights via the antenna and a transceiver circuitry 11.

The processing unit 8 may be configured to adjust the adaptively adjustable weights of the neural network 9 based on said configuration data.

The hearing aid 1 may further comprise a sound scene classifier 12 configured to classify said acoustic environment of the hearing aid user into a number of different sound scene classes.

The hearing aid 1 may further comprise a detector/sensor/estimator 13, such as an SNR estimator, an SPL estimator, at least one physiological sensor, and/or at least one accelerometer.

Alternatively, or additionally, the auxiliary device 2 may comprise a detector/sensor/estimator 13, such as an SNR estimator, an SPL estimator, at least one physiological sensor, and/or at least one accelerometer, and/or a sound scene classifier.

The auxiliary device 2 may comprise a further neural network 14, such as a weight generating network, for determining said configuration data.

The auxiliary device 2 may comprise an antenna and a transceiver circuitry (not shown) for establishing a communication link between the hearing aid 1 and the auxiliary device 2, and thereby allowing the exchange of information (e.g. the configuration data) between the hearing aid 1 and the auxiliary device 2.

Figure 2:
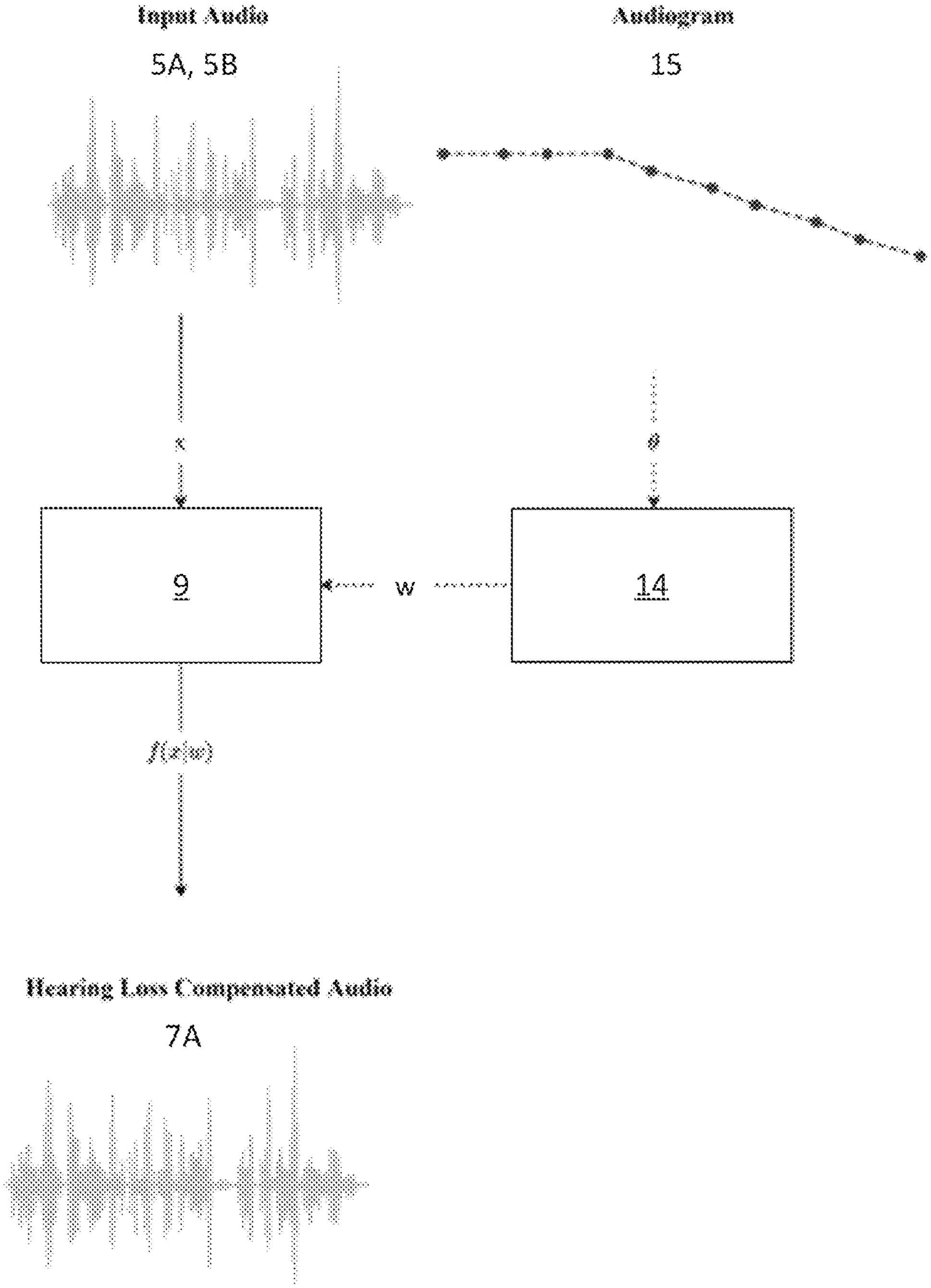
FIG. 2 shows an exemplary hearing system according to the present application.

FIG. 2 shows an exemplary hearing system according to the present application.

In FIG. 2, the neural network 9 of the processing unit is shown to be a Wave-U-Net.

As also shown, the neural network 9 of the processing unit may receive and process at least one electric input signal 5A,5B from the input unit 3. At least one set of stimuli perceivable as sound to the hearing aid user based on processed versions of said at least one electric input signal 5A,5B may be provided as a result of the processing of the at least one electric input signal 5A,5B in the processing unit.

A further neural network 14 (the weight generating network) is an MLP—a 3 layer fully connected network. Each layer may be found by a weighted sum over three kernels, where the output of the further neural network 14 generates weights ('w'). The further neural network 14 may be trained on input-output-audiogram pairs 15, generated by a reference model, and provided as input to the further neural network (Θ is the network parameter space).

For example, consider the case of a hearing aid user going to a Hearing Care Professional (HPC) to get a hearing aid fitted. The hearing aid may have a neural network that provides compensation for hearing loss, as illustrated in FIG. 2. This hearing loss can be measured using an audiogram (but it might also be other suprathreshold measures or physiological estimates such as fiber distributions in the auditory nerve synapse).

In order to train the further neural network, one needs to generate a dataset consisting of input-output pairs that covers the distribution of audio and audiograms—here the inputs may both be speech and audiograms.

Figure 3:
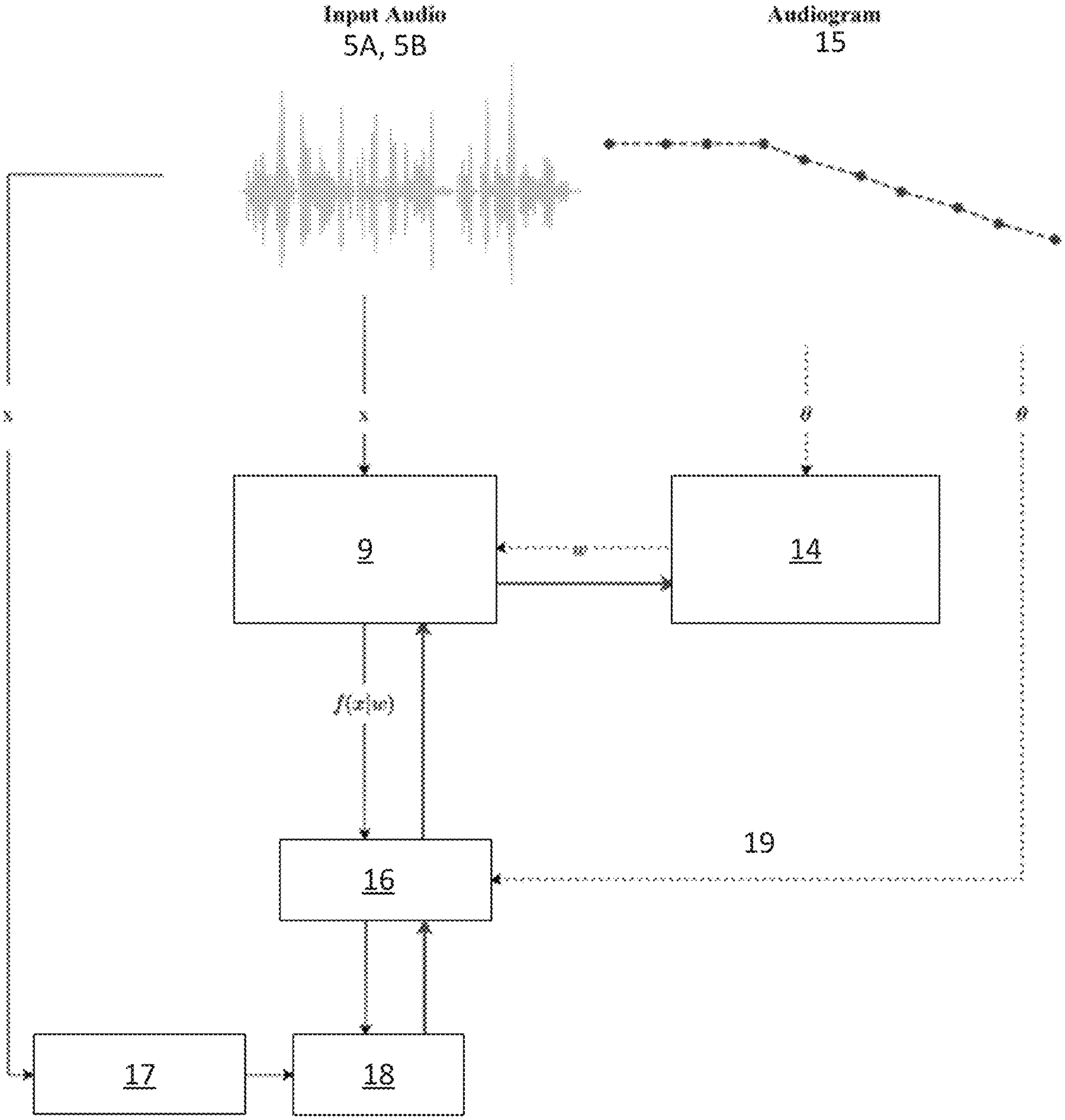
FIG. 3 shows an exemplary training of a neural network of the processing unit of the hearing aid according to the present application.

FIG. 3 shows an exemplary training of a neural network of the processing unit of the hearing aid according to the present application.

In addition to the features already described in connection with FIG. 2, FIG. 3 shows the training of the neural network 9 of the processing unit, which may be carried out e.g. at the hearing care professional (HCP) prior to the hearing aid user starts using the hearing aid or during service.

The training is carried out in that the neural network 9 of the processing unit provides a hearing impaired representation of the at least one electric input signal 5A,5B, based on an auditory model of deficient hearing 16 of the hearing aid user. Additionally, a normal hearing representation of the at least one electric input signal 5A,5B is provided, based on an auditory model of a normal hearing 17. An objective function 18 may provide an error measure. The training may be based on a plurality of different electric input signals until the error measure is below a preset threshold. At that time, the neural network 9 of the processing unit can be considered to be sufficiently trained. To further adjust the (precision of) the auditory model of deficient hearing 16 of the hearing aid user, the auditory model 16 may be trained on e.g. the audiogram of the hearing aid user 19 or e.g. on one or more suprathreshold measures.

The configuration data may be based on a frequency dependent gain parameter.

For example, for the HCP to finetune the hearing aid manually, the configuration data (e.g. auxiliary parameters input to the further neural network) may include a frequency dependent gain parameter. This may be done by generating a new set of parameters that parameterizes the loss function—i.e., a frequency weighting of the different channels in the loss function. For example, if the hearing aid user wants more brightness, one can put an emphasis on the higher frequency channels. These parameters may then also be used as inputs for the further neural network. There might also be a parameter related to the amount and type of compression, which could be parameterized in the loss function.

Figure 4:
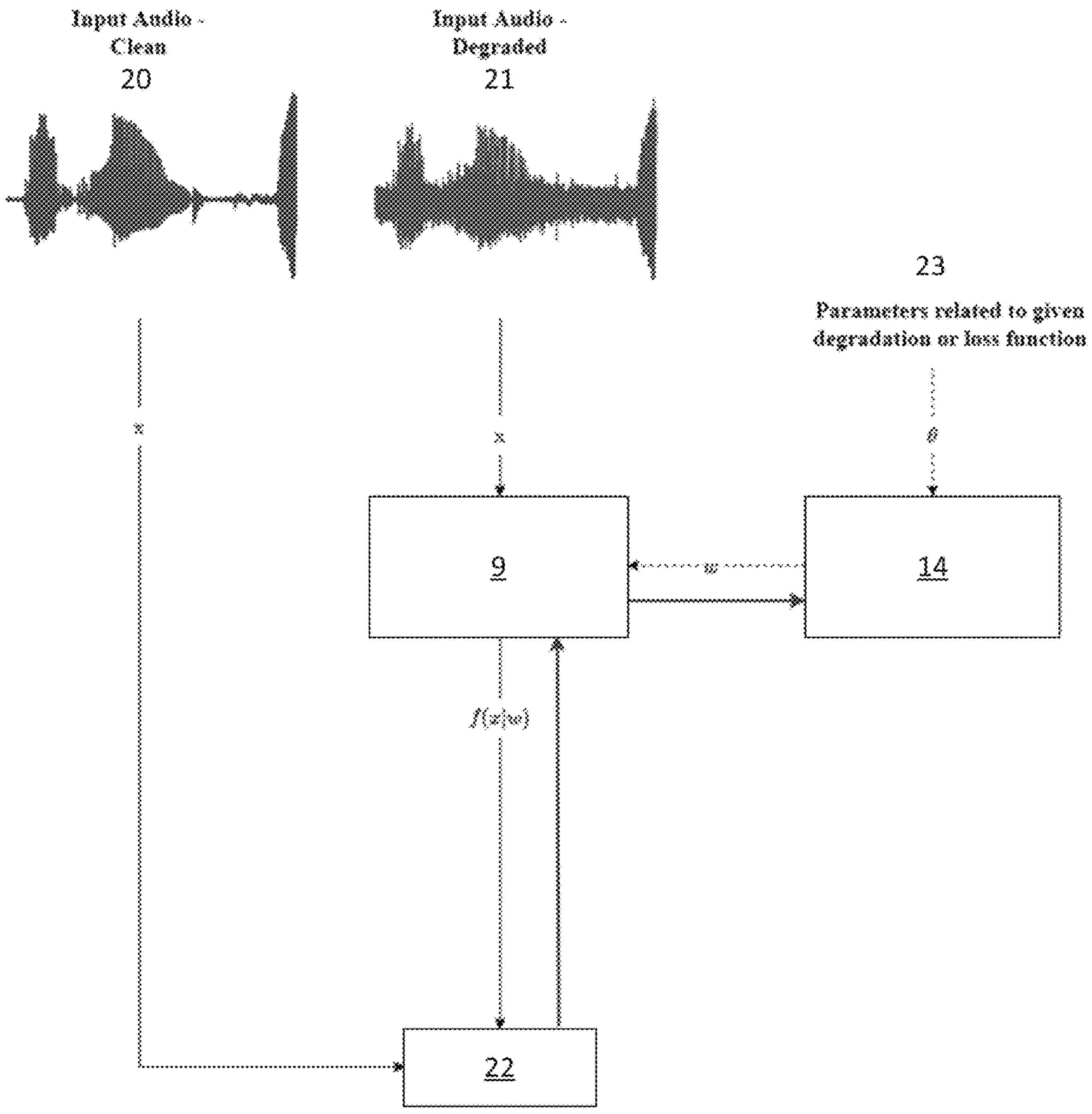
FIG. 4 shows an exemplary training of a neural network of the processing unit of the hearing aid according to the present application.

FIG. 4 shows an exemplary training of a neural network of the processing unit of the hearing aid according to the present application.

In FIG. 4, the bold path denotes the electric input signal paths, the dashed lines the parameter (weight) paths, and the blue line the backpropagation path.

In FIG. 4, an example is considered, where a hearing aid user has a hearing aid with a speech enhancement system (e.g. including noise reduction, dereverberation, etc.) that changes as a function of conditions. This might be measured conditions (e.g. SNR, type of environment, EEG, or maybe some combination feature of these) or by choice of the hearing aid user. This might be evaluated on the-go, and the further neural network (e.g. the weight generating network) may be a co-processor, that is potentially on an auxiliary device.

The degradations might be simulated or recorded degradation of an input speech signal, e.g., recording of speech in a noisy café, or a simulation of speech in a reverberant room, or a combination.

In this example, a training set consists of data that covers the distribution of input audio signal and the degraded audio signal 21. The loss function 22 might consist of different terms that may be parameterized to generate softer/harder noise reduction, some specific form of beamforming, softer/harder dereverberation, or frequency specific noise-reduction, etc. For the noise reduction case, this may be done by having a term that minimizes speech distortion versus another term that optimizes SNR and parameterizing these, or even a loss function that optimizes speech quality versus speech intelligibility.

The parameters 23 related to the given degradation could be categorical, e.g., in a car, at a restaurant, music program, and could be implemented as a one-hot-encoded variable over the categorical distribution or embedded in a continuous space. The parameters 23 might also be continuous (e.g. a measurement of SNR, a beamform pattern, statistical parameters) or ordinal (e.g. low NR, medium NR, high NR). These parameters 23 could be related to a program or be optimal under different cognitive loads. The cognitive load could be measured by for example Ear-EEG, and if the load is large, one might want to apply a specific form of noise reduction, and the further neural network may generate weights to handle this situation better, which might be a strategy that favours speech intelligibility over speech quality.

Figure 5:
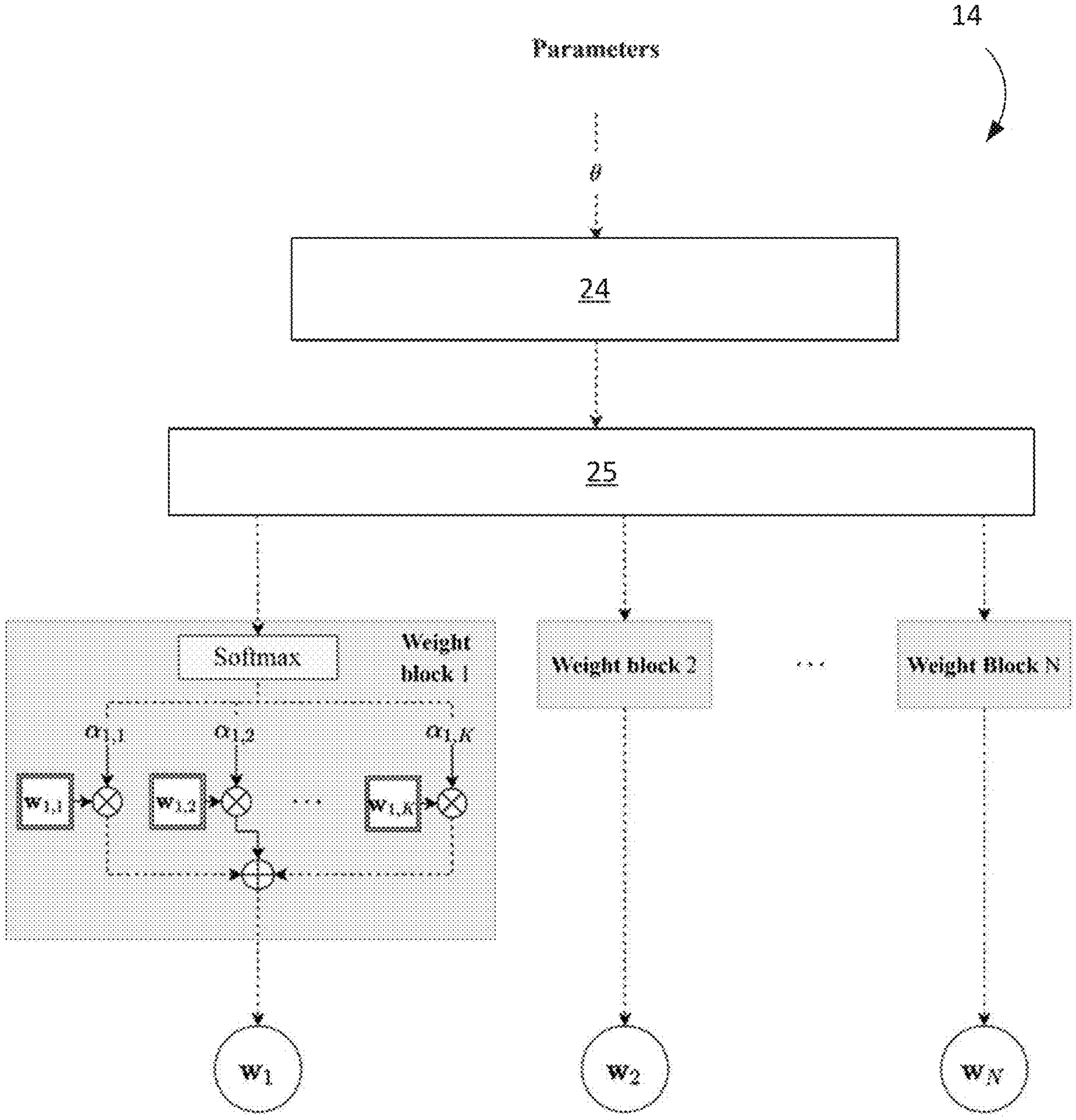
FIG. 5 shows an exemplary weight generating network according to the present application.

FIG. 5 shows an exemplary weight generating network according to the present application.

The weight generating network 14 of FIG. 5 may be a 3-layer multi-layer-perceptron (fully connected neural network). However, the weight generating network 14 may be any neural network.

In FIG. 5, the weight generating network 14 may parameterize a distribution of possible candidate tensors (matrices) $w_{n,k}$ containing the parameters of the neural network, where n is the nth parameter block of the neural network, and k is the candidate parameter tensor.

The $\alpha_{n,k}$ may be generated by the weight generating network 14, by feeding the model parameters found from the audiogram through a 3-layer Multi-Layer Perceptron (MLP) 24, e.g., a fully connected feedforward network with 3 layers. The output of the MLP has dimensions (1, KN), and may be reshaped 25 into a matrix of dimension (N, K). This matrix may be split into N different K-dimensional vectors, and a Softmax function (Weight block 1', etc.) may be computed across the K elements in each vector, outputting $0 \leq \alpha_{n,k} \leq 1$, which may be used to generate one single weight tensor:

$$w_n = \sum_{k=1}^{K} \alpha_{n,k} w_{n,k}$$

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element, but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method are not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

REFERENCES

[1] Yang, B., Le, Q. V., Bender, G., & Ngiam, J. (2019). CondConv: Conditionally parameterized convolutions for efficient inference. Advances in Neural Information Processing Systems, 32(NeurIPS).

The invention claimed is:

1. Hearing aid adapted to be worn in or at an ear of a hearing aid user and/or to be fully or partially implanted in the head of the hearing aid user, the hearing aid comprising:

an input unit for receiving an input sound signal from an acoustic environment of a hearing aid user and providing at least one electric input signal representing said input sound signal, an output unit for providing at least one set of stimuli perceivable as sound to the hearing aid user based on processed versions of said at least one electric input signal, a processing unit connected to said input unit and to said output unit, where the processing unit comprises a neural network, and where the processing unit is configured to determine signal processing parameters of the hearing aid based on adaptively adjustable weights of the neural network, whereby the processing unit provides processed versions of said at least one electric input signal, a memory storing said weights of said neural network, and an antenna and a transceiver circuitry for establishing a communication link to an auxiliary device, wherein the hearing aid is configured to receive configuration data comprising a plurality of coefficients from the auxiliary device regarding adjustment of said adaptively adjustable weights, wherein the processing unit is configured to adjust the adaptively adjustable weights of the neural network based on said configuration data, and wherein said adaptively adjustable weights of the neural network of the processing unit are adjusted based on weights resulting from a linear combination of said plurality of coefficients and a plurality of matrices each comprising a plurality of weights, where said plurality of matrices are stored on the memory of the hearing aid.

2. Hearing aid according to claim 1, wherein said configuration data is based on a hearing ability of the hearing aid user, and/or a sound scene classification of the sound environment of the hearing aid user, and/or on a physiological parameter of the hearing aid user.

3. Hearing aid according to claim 1, wherein the configuration data comprises a further neural network, and where the adaptively adjustable weights of the neural network of the processing unit are adjusted by replacing the neural network of the processing unit by said further neural network of the configuration data.

4. Hearing aid according to claim 1, wherein the configuration data comprises weights of a neural network, and where the adaptively adjustable weights of the neural network of the processing unit are adjusted by replacing said weights by the weights of said configuration data.

5. Hearing aid according to claim 1, wherein, based on the configuration data, the processing unit is configured to determine signal processing parameters relating to noise reduction, hearing loss compensation, and/or feedback reduction of the hearing aid user.

6. Hearing aid according to claim 1, wherein the hearing aid comprises a sound scene classifier configured to classify said acoustic environment of the hearing aid user into a number of different sound scene classes, and to provide a current sound scene class in dependence of a current representation, e.g. extracted features, of said at least one electric input signal.

7. Hearing aid according to claim 1, wherein the auxiliary device is a hearing aid, a smart phone, or a server device such as a cloud server.

8. Hearing aid according to claim 1, wherein the hearing aid further comprises a signal-to-noise ratio (SNR) estimator configured to determine SNR in the environment of the hearing aid user, and/or a sound pressure level (SPL) estimator for measuring the level of sound at the input unit, and/or at least one physiological sensor, and/or at least one accelerometer.

9. Hearing system comprising a hearing aid adapted to be worn in or at an ear of a hearing aid user and/or to be fully or partially implanted in the head of the hearing aid user and an auxiliary device, wherein each of the hearing aid and the auxiliary device including an antenna and a transceiver circuitry for establishing a communication link there between, and thereby allowing the exchange of information between the hearing aid and the auxiliary device, the hearing aid comprising a processing unit comprising a neural network, and where the processing unit is configured to determine signal processing parameters of the hearing aid based on adaptively adjustable weights of the neural network, whereby the processing unit provides processed versions of at least one electric input signal, and a memory storing said weights of said neural network, wherein the hearing aid is configured to receive configuration data from the auxiliary device regarding adjustment of said adaptively adjustable weights wherein the processing unit is configured to adjust the adaptively adjustable weights of the neural network based on said configuration data, and wherein the auxiliary device comprises a weight generating network for determining said configuration data.

10. Hearing system according to claim 9, wherein the weight generating network is configured to determine said configuration data based on one or more auxiliary parameters, where said auxiliary parameters comprises a hearing ability of the hearing aid user, and/or a sound scene classification of the sound environment of the hearing aid user, and/or on a physiological parameter of the hearing aid user.

11. Hearing system according to claim 9, wherein the auxiliary device comprises a sound scene classifier configured to classify said acoustic environment of the hearing aid user into a number of different sound scene classes, and to provide a current sound scene class in dependence of a current representation, e.g. extracted features, of a sound signal from the acoustic environment of the hearing aid user, and where the sound scene classifier is configured to provide said current sound scene class as input to said weight generating network.

12. Hearing system according to claim 9, wherein the auxiliary device comprises an SNR estimator, an SPL estimator, at least one physiological sensor, and/or at least one accelerometer, and where the weight generating network is configured to determine said configuration data based on the one or more auxiliary parameters from said SNR estimator, SPL estimator, at least one physiological sensor, and/or at least one accelerometer.

13. Hearing system according to claim 9, wherein the weight generating network for determining said configuration data is initiated by input from the hearing aid user.

14. Method comprising:

receiving an input sound signal from an acoustic environment of a hearing aid user and providing at least one electric input signal representing said input sound signal, by an input unit, providing at least one set of stimuli perceivable as sound to the hearing aid user based on processed versions of said at least one electric input signal, by an output unit, determining signal processing parameters of the hearing aid based on adaptively adjustable weights of a neural network, by a processing unit connected to said input unit and to said output unit and comprising the neural network, providing processed versions of said at least one electric input signal, by the processing unit, storing said weights of the hearing aid, by a memory, and establishing a communication link to an auxiliary device, by an antenna and a transceiver circuitry, wherein the hearing aid receives configuration data comprising a plurality of coefficients from the auxiliary device regarding adjustment of said adaptively adjustable weights, wherein the processing unit adjusts the adaptively adjustable weights of the neural network based on said configuration data, and wherein said adaptively adjustable weights of the neural network of the processing unit are adjusted based on weights resulting from a linear combination of said plurality of coefficients and a plurality of matrices each comprising a plurality of weights, where said plurality of matrices are stored on the memory of the hearing aid.

15. A data processing system comprising a processor and program code means for causing the processor to perform at least some of the steps of the method of claim 14.

16. A computer program comprising instructions which, when the program is executed by a computer, cause the computer to carry out the method of claim 14.

17. Hearing system comprising a hearing aid adapted to be worn in or at an ear of a hearing aid user and/or to be fully or partially implanted in the head of the hearing aid user and an auxiliary device, wherein each of the hearing aid and the auxiliary device including an antenna and a transceiver circuitry for establishing a communication link there between, and thereby allowing the exchange of information between the hearing aid and the auxiliary device, the hearing aid comprising a processing unit comprising a neural network, and where the processing unit is configured to determine signal processing parameters of the hearing aid based on adaptively adjustable weights of the neural network, whereby the processing unit provides processed versions of at least one electric input signal, and a memory storing said weights of said neural network, wherein the hearing aid is configured to receive configuration data from the auxiliary device regarding adjustment of said adaptively adjustable weights, wherein the processing unit is configured to adjust the adaptively adjustable weights of the neural network based on said configuration data, and wherein a weight generating network for determining said configuration data is initiated based on the current sound scene class or data from said SNR estimator, SPL estimator, at least one physiological sensor, and/or at least one accelerometer exceeding respective threshold values.

* * * * *